UNITED STATES PATENT OFFICE.

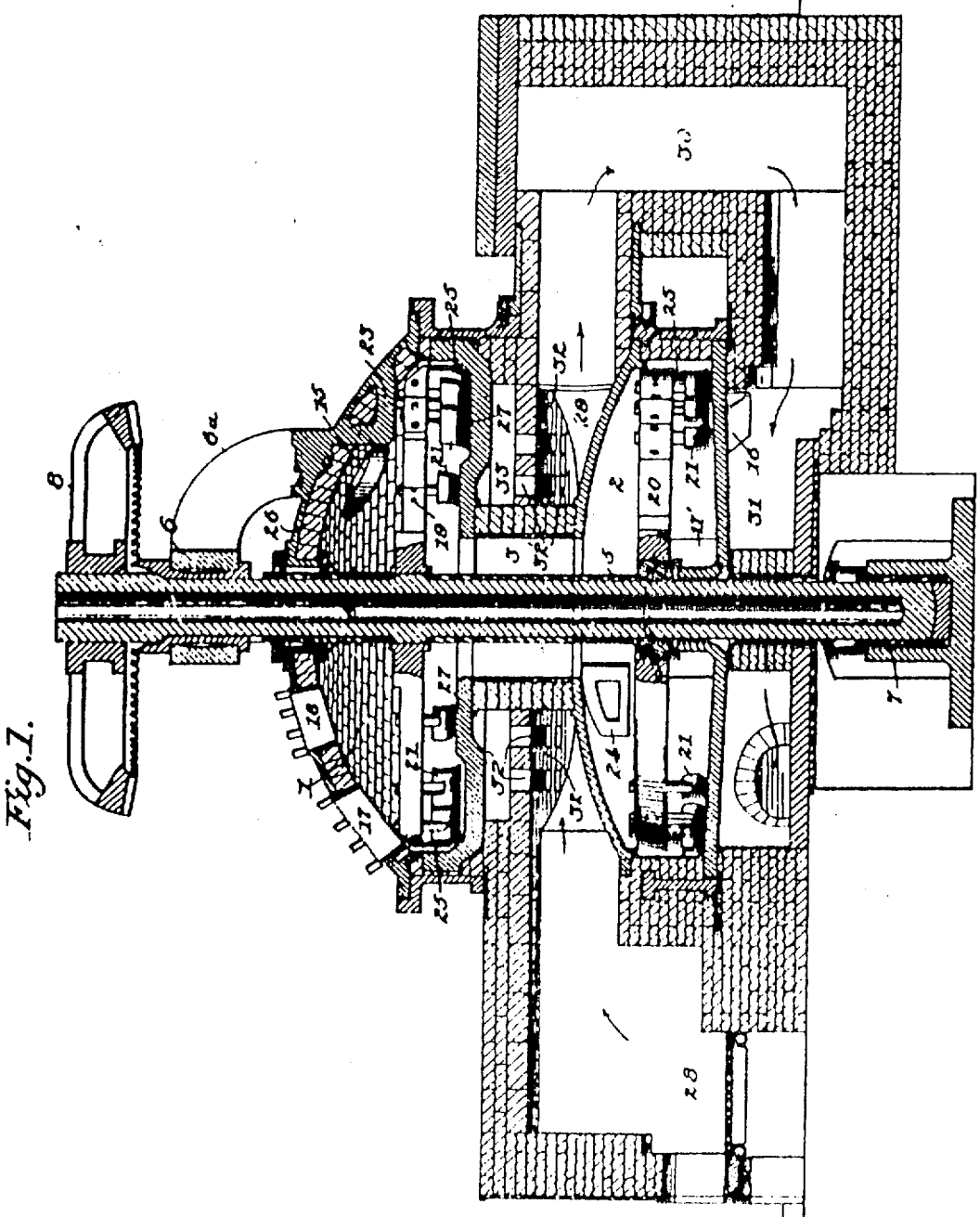

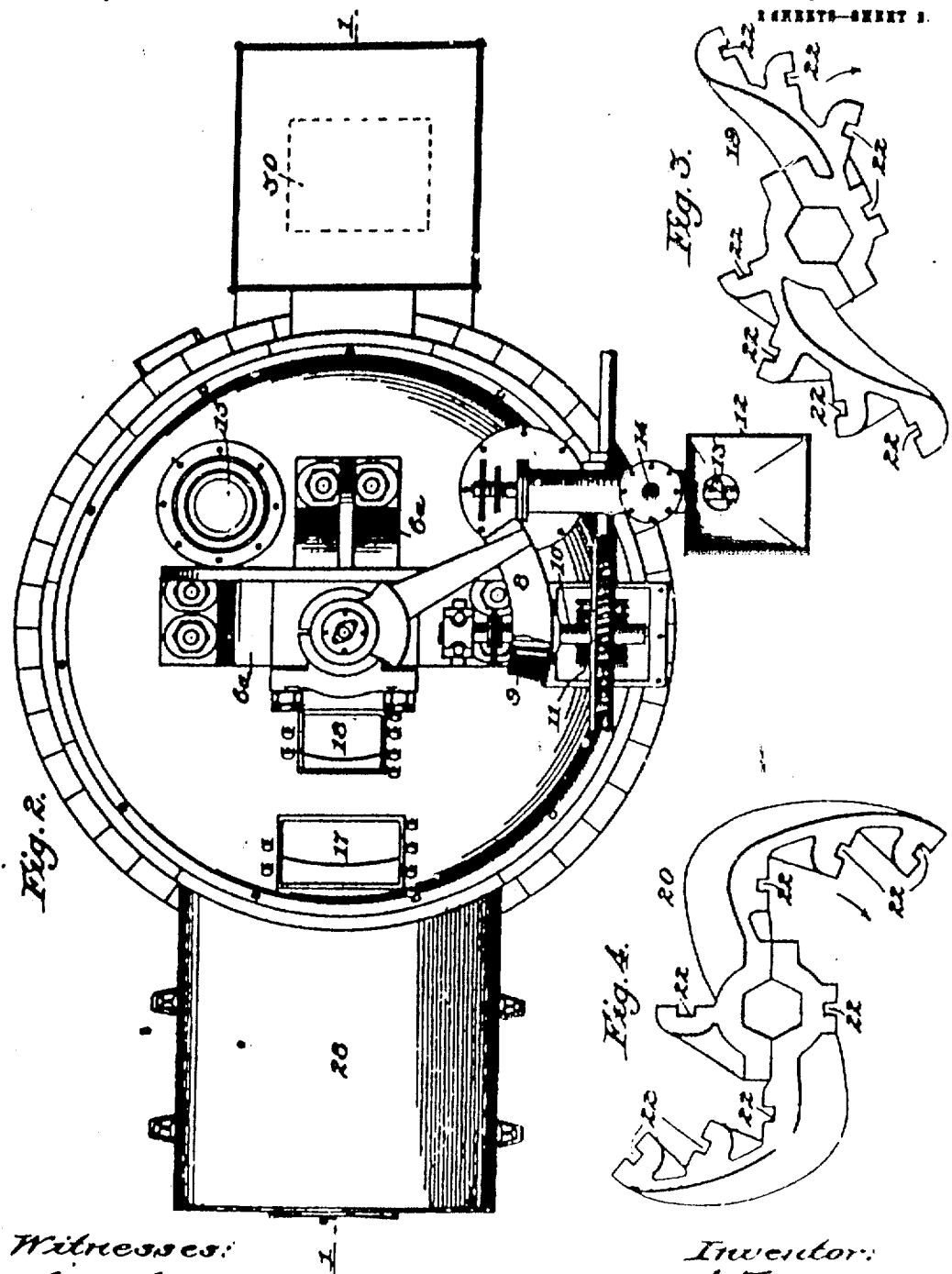

JOHN L. TUFTS, OF BOSTON, MASSACHUSETTS, ASSIGNOR OF ONE-HALF TO MERRIMAC CHEMICAL COMPANY, A CORPORATION.

CHEMICAL-REACTION FURNACE.

No. 930,441.     Specification of Letters Patent.     Patented Aug. 10, 1909.

Application filed June 19, 1906, Serial No. 322,409. Renewed April 22, 1909. Serial No. 491,599.

*To all whom it may concern:*

Be it known that I, JOHN L. TUFTS, a citizen of the United States, residing at Boston, in the county of Suffolk and State of Massachusetts, have invented certain new and useful Improvements in Chemical-Reaction Furnaces, of which the following is a specification.

This invention is a furnace or reaction vessel for chemical purposes, particularly designed for carrying into effect such reactions as occur in two or more stages requiring different temperature or rabbling conditions. As examples of such reactions I may refer to the manufacture of hydrochloric acid by decomposing sodium chlorid by means of sulfuric acid, and the manufacture of acetic acid by the decomposition by sulfuric acid of calcium acetate.

The furnace is simple in construction and may be installed at moderate cost; in practice it has been found to be economical as regards expenditure of fuel and efficient as regards the production and recovery of the product. The furnace is adapted for continuous operation; in its preferred form it comprises independent but communicating chambers corresponding in number to the practical working stages of the reaction, means in the chambers for stirring, mixing or working the charge or reaction mixture and for transferring it from one chamber to another, and means for applying heat to the charge in the chambers in such manner as to avoid dilution of the reaction products.

The construction of the furnace is such that with an economical application of fuel the chambers may be subjected to a temperature adapted to the character or stage of the reaction, while avoiding overheating of the charge or of the materials of which the furnace is composed. Preferably the chamber in which the reaction proceeds through its initial stage is so constructed as to retain the charge until such stage has been completed, the charge being then automatically transferred to a subsequent chamber or chambers, systematically arranged, with suitable communicating channels, and further treated or calcined therein at such higher temperature as may be required.

For a full understanding of my invention reference is made to the accompanying drawings, wherein:

Figure 1 is a vertical longitudinal section of a preferred form of furnace on line 1—1 of Fig. 2; Fig. 2 is a plan view of the apparatus shown in Fig. 1, portions of the bevel gear for operating the stirring mechanism being broken away; and Figs. 3, 4 are plan views of stirring arms adapted for use in the upper and lower chambers, respectively.

Referring to the drawings, the furnace is shown as comprising superposed chambers 1, 2, communication between which is established through a vertical flue 3.

4 is a vertical shaft, suitably incased as indicated at 5, extending through the chambers and the flue 3 and mounted in suitable upper and lower bearings 6 and 7, the upper bearing 6 being supported by yokes 6ª mounted on the furnace casing. A bevel gear 8 secured to the shaft 4 above the upper chamber 1 meshes with a bevel gear 9 carried by a shaft 10 and adapted to be driven by a worm gear 11; for clearness of illustration the casing of the worm gear 11, which carries also the bearings for the shaft 10, is removed. It will be understood that the shaft may be driven by a bevel gear or equivalent means secured to the lower portion thereof. The charge, which may consist in one specific instance of sodium chlorid and sulfuric acid in reacting proportions, is fed, preferably continuously, to the upper chamber at a point near the periphery thereof. In the construction shown the salt is supplied to a hopper 12, and carried by a screw conveyer 13 to the chamber 1, the acid being introduced into the casing of said conveyer intermediate its ends through pipe 14; this arrangement insures a thorough mixing of the charge prior to its introduction into the furnace. An aperture for the escape of gaseous reaction products is provided at 15, in the dome of the upper reaction chamber, and communicates with suitable condensing or collecting devices as will be readily understood; and a self-sealing discharge gate 16 is provided near the periphery of the lower chamber.

17, 18 represent normally closed apertures affording access to the interior of the furnace; an aperture 17' gives access to the chamber 2.

Secured to the shaft 4 and projecting into the upper and lower chambers respectively are arms 19, 20 carrying adjustably mounted plows or mixing or stirring blades 21 adapted in curvature and set to effectively work and transfer the materials, as hereinafter described. Said arms are shown in plan in Figs. 3, 4: The plows carried by the arm 19 in the upper chamber are so disposed as to move the solid portions of the mixture inwardly and to discharge the same by flue 3 into the lower chamber, the plows in said lower chamber being so disposed as to move the mixture outwardly and to discharge it through the peripheral opening or openings 16. It will be noted that the sockets 22 carrying the plow blades are so disposed in each of these arms that the material displaced by the plows carried by one half-arm is moved directly into the path of a plow carried by the other half-arm, thereby effecting a positive transfer of the material in the direction above indicated. The plows may be held rigidly in the sockets of the plow arms or may have a free vertical movement therein.

In order to prevent the charge from massing under any conditions around and above the stirring arms, I prefer to provide in each chamber one or more stationary wipers 23, 24, preferably in the form of open frames or blades of metal projecting from the domes of the respective chambers; these wipers are disposed immediately above the plow arms and serve as above noted to prevent accumulation thereon of the reacting mass even when in the condition of a very stiff and heavy paste. In order to prevent accumulation of material on the sides of the chambers I preferably provide scrapers 25, illustrated as integral with the clamping member of the outermost plow in each chamber.

The hearth and dome of each chamber are preferably constructed of cast iron, the wall of the lower chamber being indicated as interiorly faced with refractory brick. Where a comparatively high temperature is employed cast iron may be exposed to the reacting mixture and its products without serious or rapid corrosion, whereas at relatively low temperatures it is attacked with comparative rapidity owing to condensation of acid. For this reason I prefer to provide a refractory lining, as indicated at 26, for such interior surfaces as are not in immediate proximity to the flues, as, for instance, the dome of the upper reacting chamber.

It is desirable in effecting reactions of the character above described that the material should be retained in the upper chamber until the initial stage of the reaction is complete and until it has reached a solid as distinguished from a pasty or mobile condition. It is further desirable that the material in said upper chamber should be subjected to a relatively low temperature, and that the rate of evolution of gas therefrom should be maintained as nearly constant as is practicable in order that the condensers may be effectively utilized. In the hearth of the upper chamber 1 I provide one or more peripheral channels or depressions 27, into the outer of which the fresh material is fed and in which it is worked by the outer plows 21, being kept by means of these channels or depressions in a more or less stratified condition. This material being in the pasty or mobile condition above described is not displaced from the channels by the plows, but is merely worked, stirred or moved therein until portions of it become solid, whereupon such portions are displaced from the channel by the plows, to be discharged by flue 3 into the lower chamber. Such working and transfer of the material in the initial stage of the reaction is automatically effected, and the arrangement is such as to insure the retention of the charge in the upper chamber until it has attained the solid state and is adapted for treatment at a higher temperature in the lower chamber.

In order to secure the proper temperature conditions in the respective chambers, I prefer to provide a combustion furnace 28, having flues 29, 30, 31 extending between the chambers and thence beneath the lower chamber. Beneath the upper or initial chamber 1, and within the flue 29, I arrange means for preventing direct access of the heated flue gases to the hearth of said initial chamber: Any means which will check or prevent the direct circulation of the heated gases in contact with this hearth will suffice, such, for instance, as a partition extending inwardly from the setting of the hearth but providing an annular aperture around the sheathing of the vertical flue 3; my preferred construction, however, is a checkerwork arch of fire-brick as indicated at 32 in Fig. 1, providing a dead gas space 33 beneath the hearth of the upper chamber said gas space communicating through numerous apertures 32' with the flue 29. This arrangement of flues insures a proper distribution of heat with a marked economy of fuel. The lower or calcining chamber 2 is subjected to a high and uniform temperature, while the upper chamber receives such moderate heating as the initial stage of the reaction requires, and no portion of the chambers or of the furnace construction is liable to overheating.

The method of effecting reactions herein described is claimed in my copending application Serial Number 322,408, filed June 19, 1906.

I claim:

1. A chemical reaction furnace comprising communicating chambers, means for applying heat thereto, and means for working material in said chambers and transferring it between said chambers, said means constructed and arranged to retain the material in one of said chambers until portions of it acquire a substantially solid condition and then to displace such solid portions to another chamber, substantially as described.

2. A chemical reaction furnace comprising communicating chambers, heating flues in proximity to said chambers, and means for working material in said chambers and transferring it between said chambers, said means constructed and arranged to retain the material in one of said chambers until portions of it acquire a substantially solid condition and then to displace such solid portions to another chamber, substantially as described.

3. A chemical reaction furnace comprising superposed communicating reaction chambers, heating means therefor, a rotatable vertical shaft extending through said chambers, and plow arms and plows in said chambers secured to said shaft, the hearth of one of said chambers being provided with a depression or depressions adapted to retain the more fluid portions of the charge, the plows in said chamber depending into said depression, substantially as described.

4. A chemical reaction furnace, comprising a chamber having a hearth, a flue beneath said hearth, and an apertured partition above said flue and arranged to provide a dead gas space between said flue and hearth, substantially as described.

5. A chemical reaction furnace comprising superposed communicating reaction chambers, a flue between said chambers, and means arranged to provide a dead gas space between said flue and the hearth of the upper chamber, substantially as described.

6. A chemical reaction furnace comprising superposed substantially closed communicating reaction chambers, and means for directing heated gases between said chambers and thence beneath the lower chamber, substantially as described.

7. A chemical reaction furnace comprising superposed communicating reaction chambers, means for directing heated gases between said chambers and thence beneath the lower chamber, and means beneath the hearth of the upper chamber for preventing free access thereto of the heated gases, substantially as described.

In testimony whereof, I affix my signature in presence of two witnesses.

JOHN L. TUFTS.

Witnesses:
ARTHUR P. CARPENTER,
FRANCIS M. RYDER.